(12) United States Patent
Buerker et al.

(10) Patent No.: US 11,410,430 B2
(45) Date of Patent: Aug. 9, 2022

(54) SURROUND VIEW SYSTEM HAVING AN ADAPTED PROJECTION SURFACE

(71) Applicant: Conti Temic microelectronic GmbH, Nuremberg (DE)

(72) Inventors: Martin Buerker, Ulm (DE); Charlotte Gloger, Ulm (DE); Andreas Panakos, Neu-Ulm (DE); Frank Kittmann, Ulm (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 35 days.

(21) Appl. No.: 16/979,308

(22) PCT Filed: Feb. 26, 2019

(86) PCT No.: PCT/DE2019/200018
§ 371 (c)(1),
(2) Date: Sep. 9, 2020

(87) PCT Pub. No.: WO2019/170202
PCT Pub. Date: Sep. 12, 2019

(65) Prior Publication Data
US 2021/0004614 A1  Jan. 7, 2021

(30) Foreign Application Priority Data
Mar. 9, 2018 (DE) ............ 10 2018 203 590.3

(51) Int. Cl.
*G06V 20/58* (2022.01)
*G06V 20/64* (2022.01)

(52) U.S. Cl.
CPC ............ *G06V 20/58* (2022.01); *G06V 20/64* (2022.01)

(58) Field of Classification Search
CPC ......... G06T 15/04; G06T 17/00; G06T 17/05; G06T 19/20; G06T 2219/2021;
(Continued)

(56) References Cited

U.S. PATENT DOCUMENTS 5,644,689 A * 7/1997 Ban .................. G06T 15/10
345/424
9,013,286 B2   4/2015 Chen et al.
(Continued)

FOREIGN PATENT DOCUMENTS

DE   102009005505   10/2009
DE   102011084554   4/2013
(Continued)

OTHER PUBLICATIONS

Translated version of DE10 2009 005 505 (Year: 2009).*
(Continued)

*Primary Examiner* — Carol Wang
(74) *Attorney, Agent, or Firm* — RatnerPrestia

(57) ABSTRACT

A surround view system for a vehicle includes a detection unit and an evaluation unit. The detection unit is designed to detect data relating to the surroundings. The evaluation unit is designed to identify an object in the detected surroundings data and to determine the 3D shape of this object. The evaluation unit is additionally designed to add the determined 3D shape to a projection surface of the surround view system to produce a modified projection surface. The evaluation unit is designed to project the surroundings data onto the modified projection surface.

11 Claims, 2 Drawing Sheets

(58) Field of Classification Search
CPC ........... G06K 9/00805; G06K 9/00201; G06V 20/58; G06V 20/64

See application file for complete search history.

(56) References Cited

U.S. PATENT DOCUMENTS

| | | | |
|---|---|---|---|
| 9,538,073 | B2 | 1/2017 | Kim |
| 9,834,143 | B2 | 12/2017 | Zhang et al. |
| 10,291,846 | B2 | 5/2019 | Liepelt et al. |
| 10,477,102 | B2 | 11/2019 | Friebe et al. |
| 10,692,284 | B2 | 6/2020 | Milz et al. |
| 10,825,147 | B2 | 11/2020 | Friebe et al. |
| 10,902,622 | B2 | 1/2021 | Friebe et al. |
| 10,904,432 | B2 | 1/2021 | Arbeiter et al. |
| 10,937,201 | B2 | 3/2021 | Arbeiter et al. |
| 11,145,112 | B2 | 10/2021 | Milz et al. |
| 2004/0260469 | A1 | 12/2004 | Mizusawa |
| 2005/0012685 | A1 | 1/2005 | Okada et al. |
| 2006/0258449 | A1* | 11/2006 | Yasui ............... G06T 13/20 463/31 |
| 2008/0136912 | A1 | 6/2008 | Iwano |
| 2009/0016636 | A1* | 1/2009 | Kasashima ........ H04N 5/272 382/274 |
| 2011/0032357 | A1 | 2/2011 | Kitaura et al. |
| 2011/0032374 | A1 | 2/2011 | Imanishi et al. |
| 2011/0261050 | A1 | 10/2011 | Smolic et al. |
| 2012/0300075 | A1 | 11/2012 | Yamamoto et al. |
| 2014/0104424 | A1 | 4/2014 | Zhang et al. |
| 2014/0114534 | A1 | 4/2014 | Zhang et al. |
| 2014/0152778 | A1 | 6/2014 | Ihlenburg et al. |
| 2014/0278065 | A1 | 9/2014 | Ren |
| 2014/0347470 | A1 | 11/2014 | Zhang et al. |
| 2014/0375812 | A1 | 12/2014 | Ehlgen et al. |
| 2015/0042799 | A1 | 2/2015 | Zhang et al. |
| 2015/0110420 | A1 | 4/2015 | Li et al. |
| 2015/0178884 | A1 | 6/2015 | Scholl et al. |
| 2016/0080699 | A1 | 3/2016 | Scholl et al. |
| 2016/0086333 | A1 | 3/2016 | Scholl et al. |
| 2017/0203692 | A1 | 7/2017 | Friebe et al. |
| 2018/0040103 | A1 | 2/2018 | Esparza Garcia et al. |
| 2018/0115707 | A1 | 4/2018 | Liepelt et al. |
| 2019/0156131 | A1* | 5/2019 | Akiyama ............ G06K 9/00791 |

FOREIGN PATENT DOCUMENTS

| | | |
|---|---|---|
| DE | 102014009644 | 7/2015 |
| DE | 102014208664 | 11/2015 |

OTHER PUBLICATIONS

Seiya Shimizu et al., "Wraparound View System for Motor Vehicles", Fujitsu Scientific and Technical Journal, vol. 46, No. 1, Jan. 1, 2010, XP055349887, ISSN: 0016-2523, pp. 95 to 102.

Suehiro Kananishi, "Automotive Graphics SoC for 360° Wraparound View System", Fujitsu Scientific and Technical Journal, vol. 49, No. 1, Jan. 1, 2013, XP055406438, retrieved from the Internet: URL:https://www.fujitsu.com/global/documents/about/resources/publications/fstj/archives/vol49-1/paper14.pdf, pp. 91 to 96.

Christophe Lino et al., "Intuitive and Efficient Camera Control with the Toric Space", ACM Transactions on Graphics—Proceedings of ACM SIGGRAPH 2015, vol. 34, pp. 82:1 to 82:12.

M. Bertalmino et al., "Simultaneous Structure and Texture Image Inpainting", Proceedings of the 2003 IEEE Computer Society Conference on Computer Vision and Pattern Recognition (CVPR'03), IEEE Transactions on Image Processing, vol. 12(8), Aug. 2003, 6 pages (or pp. 882-889).

Antonio Criminisi et al., "Region Filling and Object Removal by Exemplar-Based Image Inpainting", IEEE Transactions on Image Processing, vol. 13(9), Sep. 2004, pp. 1200 to 1212.

English translation of the International Search Report of the International Searching Authority for International Application PCT/DE2019/200018, dated Apr. 4, 2019, 2 pages, European Patent Office, HV Rijswijk, Netherlands.

PCT International Preliminary Report on Patentability including English Translation of PCT Written Opinion of the International Searching Authority for International Application PCT/DE2019/200018, dated Sep. 15, 2020, 7 pages, International Bureau of WIPO, Geneva, Switzerland.

German Search Report for German Patent Application No. 10 2018 203 590.3, dated Oct. 31, 2018, 8 pages, German Patent and Trademark Office, Muenchen, Germany, with English partial translation, 6 pages.

* cited by examiner

SURROUND VIEW SYSTEM HAVING AN ADAPTED PROJECTION SURFACE

FIELD OF THE INVENTION

The invention relates to a surround view system for a vehicle, a vehicle having such a surround view system, a method for adapting a projection surface of a surround view system, a program item and a computer-readable medium.

BACKGROUND INFORMATION

Vehicles are increasingly being equipped with driver assistance systems which assist the driver during the performance of driving maneuvers. These driver assistance systems partially contain surround view systems which allow the driver of the vehicle to display the vehicle environment. Such surround view systems have one or more vehicle cameras which detect real images of the vehicle environment and are subsequently merged by a data processing unit of the surround view system into an image of the vehicle environment. The image of the vehicle environment is subsequently displayed to the driver on a display unit.

To this end, the real images of the vehicle environment obtained by the cameras of the surround view system can first be projected onto projection points of a projection surface or of a virtual model of the vehicle environment. It is subsequently possible to extrapolate the composed surround view image of the vehicle environment thus produced from the perspective of a virtual camera, which can, in turn, be displayed on the display unit as a surround view image. The position of the virtual camera for the calculation of the displayed surround view image can, in this case, be varied such that, depending on the requirements or respectively depending on the driving situation, another illustration of the vehicle environment can be displayed to the driver. The selection of the three-dimensional environmental model for the projection of the real images as well as for the production of the composed surround view image is crucial for the quality of the displayed image.

SUMMARY OF THE INVENTION

It is an object of the invention to improve the projection of image data.

This object can be achieved by a surround view system and a method respectively according to the invention as set forth herein.

A first aspect of the invention relates to a surround view system for a vehicle. The surround view system comprises a detection unit and an evaluation unit. The detection unit is designed (i.e. configured) to detect data relating to the surroundings. The evaluation unit is designed (i.e. configured) to identify an object in the detected data relating to the surroundings and to determine the 3D shape of this object. The evaluation unit is additionally designed to add the determined 3D shape to a projection surface of the surround view system for the detected data relating to the surroundings such that an adapted (i.e. modified) projection surface results. The evaluation unit is designed to project the data relating to the surroundings onto the adapted projection surface.

In other words, the 3D shape of an identified object can be added to the projection surface of the surround view system, in order to obtain an improved virtual environmental model around the vehicle. In this case, the detection unit can detect data relating to the surroundings around a vehicle. This data relating to the surroundings can be processed by an evaluation unit such that the latter identifies, for example, an object in the data relating to the surroundings. The evaluation unit can additionally be designed to determine the 3D shape of the identified object, either directly by calculating or evaluating the data relating to the surroundings or indirectly by a comparison of the identified object with predefined objects. E.g. a vehicle can be identified and a typical 3D shape of a vehicle from a database can be used. The determined 3D shape of the identified object can subsequently be added to the projection surface of the surround view system. As a result, the detected data relating to the surroundings can be projected in as detailed a manner as possible and free of distortions onto the adapted projection surface and subsequently displayed to the driver, e.g. on a monitor or a display. These distortions can, in particular, result if data relating to the surroundings have been captured at a determined viewing angle or respectively a perspective, and a change in perspective towards a virtual perspective takes place for the illustration for the driver—in other words, if the virtual camera for illustration for the driver is in a different position to the actual cameras. For example, the data relating to the surroundings can have been produced by four cameras, and a surround view image is produced by the evaluation unit (e.g. the four individual images are composed), which illustrates a virtual top view (from above) onto the vehicle. This top view has been produced by the evaluation unit in that the latter produces a virtual perspective above the vehicle, based on the real detected data relating to the surroundings. During this transformation, raised objects such as, for example, other vehicles, posts or flower tubs can, due to the respective perspective during the production of the data relating to the surroundings, in particular lead to distortions in an altered virtual perspective which is subsequently displayed to the driver.

The projection surface (basic shape or respectively original shape of the projection surface) can comprise different shapes i.e. configurations, for example the shape of a dish, bowl or a plane, but also any other desired shape. The projection surface can additionally serve as a virtual environmental model of the vehicle in order to represent the detected data relating to the surroundings.

According to an embodiment of the invention, the detection unit is a camera.

Alternatively or in addition, the detection unit can comprise multiple cameras (including stereo cameras) and/or sensors for establishing depth information such as, for example, a radar, a lidar or an ultrasonic sensor or a laser scanner. The detection unit can additionally comprise a combination of the aforementioned sensors. Thanks to the depth information, the 3D shape of the identified objects can be directly determined by the evaluation unit.

According to an embodiment of the invention, the 3D shape of the identified object is predefined and corresponds to the object identified by the evaluation unit.

In other words, the 3D shape of the identified object can be determined by a comparison with a database or a table. The evaluation unit can identify an object in the detected data relating to the surroundings and compare this object with the database or the table in order to determine the 3D shape of the identified object. For example, a typical 3D shape of a vehicle, of a post or of a flower tub can be stored in the database and as soon as the object has been identified by the evaluation unit, the corresponding predefined 3D shape can be extracted from the database or respectively the table and can be added to the projection surface. Consequently, a 3D identification and additional sensors in the detection unit can be dispensed with and computing time can be saved in the evaluation unit, since the actual 3D shape of the object does not have to be determined; rather, the 3D shape is already available and can be selected and added to the projection surface.

According to a further embodiment of the invention, the evaluation unit is designed to determine the 3D shape of the identified object from the detected data relating to the surroundings of the detection unit.

The 3D shape of the identified object can also be determined by the detection unit or can be calculated by the evaluation unit. For example, the detection unit can comprise additional sensors for determining depths (e.g. radar, ultrasonic, or lidar, or laser), which are designed to determine 3D shapes. Alternatively or in addition, the evaluation unit can also calculate or respectively determine a 3D shape if, for example, data relating to the surroundings of the object of two different cameras from different viewing angles or respectively perspectives are provided, consequently the 3D shape of the identified object can be calculated or respectively determined by means of stereoscopy.

According to an embodiment of the invention, the evaluation unit is designed to fill the region concealed by the object in the data relating to the surroundings during the projection of the data relating to the surroundings onto the adapted projection surface by a predefined color or by a pattern.

As a result of adding the 3D shape of the identified object to the projection surface, a region can result in the projection surface, for which no data relating to the surroundings are provided, since the latter has been concealed by the object. In other words, the detection unit cannot see around the object. This concealed region can, for example, be filled by a predefined color or by a predefined pattern, e.g. black. In other words, the concealed region can be filled by predefined data relating to the surroundings during the projection.

According to a further embodiment of the invention, the evaluation unit is designed to fill the region concealed by the object in the data relating to the surroundings during the projection of the data relating to the surroundings onto the adapted projection surface by an interpolation of the ambient data relating to the surroundings.

In addition to filling the concealed region by a predefined color, the data relating to the surroundings of the concealed region can also be filled by means of interpolation such that interpolation takes place between the data relating to the surroundings of the regions adjoining the concealed region, in order to produce data relating to the surroundings for the concealed region.

According to an embodiment of the invention, the evaluation unit is designed to fill the region concealed by the object in the data relating to the surroundings during the projection of the data relating to the surroundings onto the adapted projection surface by a reflection of the data relating to the surroundings of the front side of the object.

The concealed region can additionally be reflected by the data relating to the surroundings of the front side of the object, wherein the front side is the side of the object, which has been detected by the detection unit. For example, if the object is a post, this typically has the same configuration at the front and back, consequently the image data of the front side can also be projected onto the back side thereof.

Alternatively or in addition, the methods described above for producing data relating to the surroundings can also be combined for the concealed region.

According to a further embodiment of the invention, the evaluation unit is designed to remove the region concealed by the object in the data relating to the surroundings from the projection surface.

In addition to filling the projection surface with produced or predefined data relating to the surroundings, the concealed region can also be removed from the projection surface. No explicit data relating to the surroundings are available for the concealed region, consequently it is not possible to make any explicit statement regarding this region either. Based thereon, the projection surface can be adapted in such a manner that the latter only contains regions, for which data relating to the surroundings are also provided.

A further aspect of the invention relates to a vehicle having a surround view system which is described above and below.

The vehicle is, for example, a motor vehicle such as a car, bus or truck, but also a rail vehicle, a ship, an aircraft such as a helicopter or airplane or, for example, a bicycle.

A further aspect of the invention relates to a method for adapting a projection surface of a surround view system. The method comprises the following steps:

detecting data relating to the surroundings by a detection unit;
identifying an object in the detected data relating to the surroundings;
determining the 3D shape of the identified object;
adding the determined 3D shape to the projection surface of the surround view system for the detected data relating to the surroundings; and
projecting the data relating to the surroundings onto the adapted projection surface.

It should be noted that the steps of the method can also be executed in a different order or can be executed simultaneously. There can additionally be a longer time span between individual steps.

A further aspect of the invention relates to a program item which, if it is run on an evaluation unit of a surround view system, instructs the evaluation unit to carry out the method which is described above and below.

A further aspect of the invention relates to a computer-readable medium, on which a program item is saved, which, if it is run on an evaluation unit of a surround view system, instructs the evaluation unit to carry out the method which is described above and below.

Further features, advantages and possible applications of the invention are set out by the following description of the exemplary embodiments and the figures.

BRIEF DESCRIPTION OF THE DRAWINGS

The figures are schematic and not true to scale. If, in the following description of the figures, the same reference numerals are indicated, these refer to the same or similar elements.

DETAILED DESCRIPTION OF EXAMPLE EMBODIMENTS OF THE INVENTION

Figure 1:
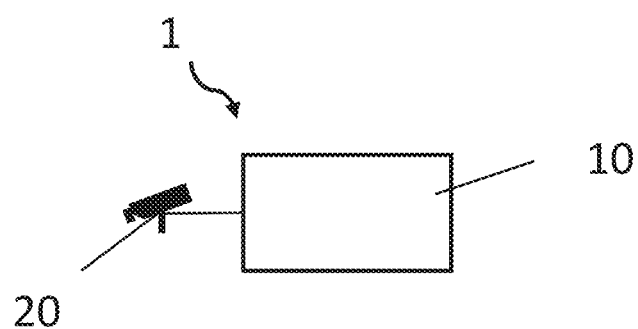
FIG. 1 shows a block diagram of a surround view system according to an embodiment of the invention.

FIG. 1 shows a block diagram of a surround view system 1 for a vehicle according to an embodiment of the invention. The surround view system 1 comprises a detection unit 20 and an evaluation unit 10. The detection unit 20 can detect data relating to the surroundings of a vehicle. For example, the detection unit 20 can comprise one camera or multiple cameras. Alternatively or in addition, the detection unit 20 can also comprise a lidar, a radar or an ultrasonic sensor, a laser scanner or a combination hereof. In particular, objects around the vehicle can be detected by the detection unit 20.

The evaluation unit 10 can merge the data relating to the surroundings detected by the detection unit 20 into a surround view image and display them for the driver of a vehicle, for example on a display unit. For the illustration of the surround view image for the driver, the detected data relating to the surroundings can be projected onto a projection surface. This projection surface can typically comprise the shape of a dish or a bowl, i.e. the regions in the immediate proximity of the vehicle can be planar and the more distant regions can be curved upwardly. The projection surface can also be understood to be a virtual environmental model around the vehicle. The projection surface can in particular be useful if the surround view image is illustrated to the driver from a different perspective to the perspectives of the detection unit. The evaluation unit 10 can additionally identify an object in the data relating to the surroundings of the detection unit 20 and determine the 3D shape thereof. The 3D shape of the identified object can, for example, be determined from the data relating to the surroundings in that, for example, a stereo camera supplies the depth information for the object or in that, for example, the detection unit 20 comprises a sensor for determining depths (e.g. a radar, ultrasonic, or lidar sensor or a laser scanner). Alternatively or in addition, the 3D shape of the objects can also be determined by way of a comparison with predefined objects, e.g. the evaluation unit 10 can identify a vehicle in the data relating to the surroundings and a predefined, typical 3D shape for a vehicle can be stored in a database. This predefined 3D shape can subsequently be used by the evaluation unit 10. The evaluation unit 10 can additionally add the determined 3D shape of the identified object or respectively of the identified objects to the projection surface, as a result of which an adapted projection surface results. In other words, the projection surface can be extended by the identified object such that the adapted projection surface constitutes a better representation of reality. As a consequence, the projection of the detected data relating to the surroundings can be improved, as a result of which, in the event of a change in perspective, distortions in the illustration can be avoided. The evaluation unit 10 can additionally project the data relating to the surroundings onto the adapted projection surface in order to display the latter to the driver of the vehicle.

Figure 2:
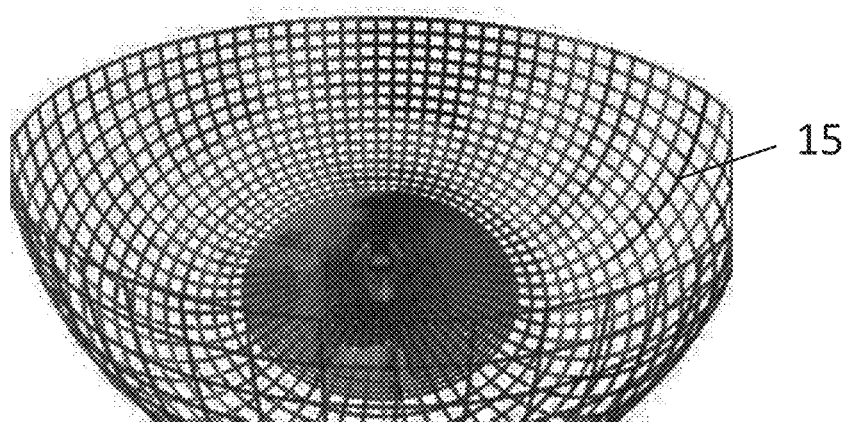
FIG. 2 shows an isometric view of the basic shape of the projection surface for a surround view system.
Figure 3:
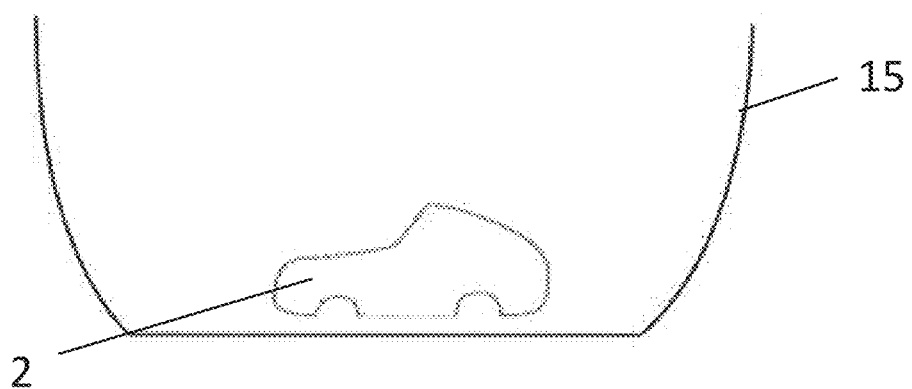
FIG. 3 shows a lateral view of the basic shape of the projection surface for a surround view system.

FIG. 2 and FIG. 3 show a projection surface 15 for a surround view system for a vehicle 2. This projection surface 15 is, on the one hand, illustrated in an isometric view (FIG. 2) and, on the other hand, in a lateral view (FIG. 3). In the middle of the projection surface 15 there is located in each case the vehicle 2 having the surround view system. The projection surface 15 comprises a shape which corresponds to the shape of a dish or bowl. In this case, the region in the vicinity of the vehicle is planar and the edge regions curve upwardly and outwardly, wherein the circumference of the projection surface steadily increases as the height increases. This shape of the projection surface means that, in a first approximation, a good representation of the data relating to the surroundings can be ensured for the surround view system. However, in the case of objects which are in reality raised, which are located in the vicinity of the vehicle, during the projection onto this projection surface 15, distortions can occur in the illustration, in particular if the perspective of the illustration is altered virtually compared with the real detected data relating to the surroundings.

Figure 4:
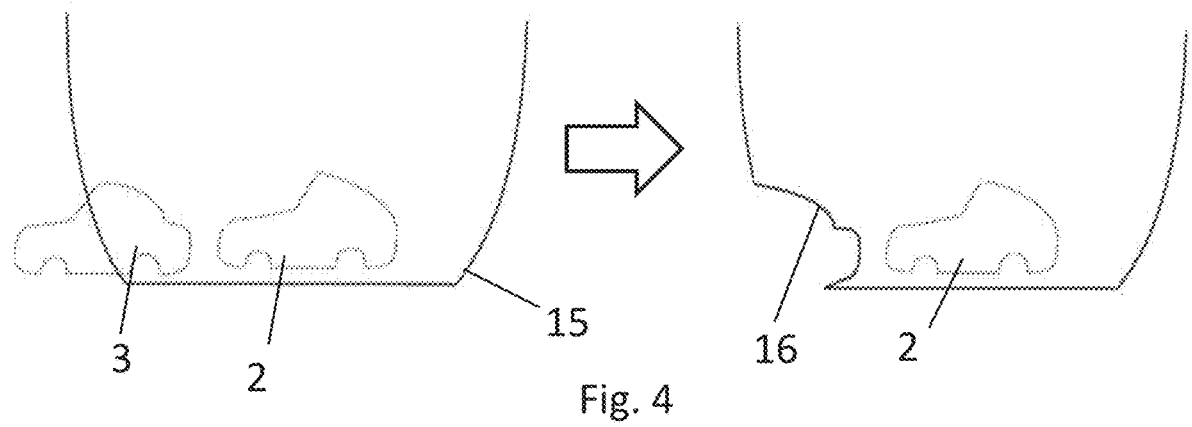
FIG. 4 shows a lateral view of an adapted projection surface for a surround view system according to an embodiment of the invention.

FIG. 4 shows an illustration of the addition of the 3D shape of the identified object 3 to the projection surface 15. On the left side of FIG. 4, a vehicle 2 and the projection surface 15 of the surround view system are illustrated. A further object 3, here a further vehicle, is additionally located on the left side of FIG. 4. This further object 3 can be identified by the surround view system and the 3D shape of the identified object can be determined by the surround view system, e.g. directly by way of sensors or indirectly by means of a comparison with a database and predefined 3D shapes for determined objects. On the right side of FIG. 4, the 3D shape of the identified object has been added to the projection surface 15 such that an adapted projection surface 16 results. Consequently, the detected data relating to the surroundings can be projected onto the projection surface in a more realistic manner. As a result of adding the 3D shape of the identified object to the projection surface 15, a concealed region in the adapted projection surface 16 can be present, for which no explicit data relating to the surroundings exist, since the object itself conceals this region. This concealed region can be dealt with in the adapted projection surface 16 in different ways. The latter can, for example, be filled with a predefined color or a predefined pattern, e.g. black. This concealed region can additionally be filled by an interpolation of the neighboring data relating to the surroundings. Moreover, the front side of the identified object can also be projected onto the back side thereof (concealed region). Alternatively or in addition, not only can the identified object be added to the projection surface, but the region concealed by the identified object can be removed from the projection surface such that data relating to the surroundings are available for the complete adapted projection surface 16.

Figure 5:
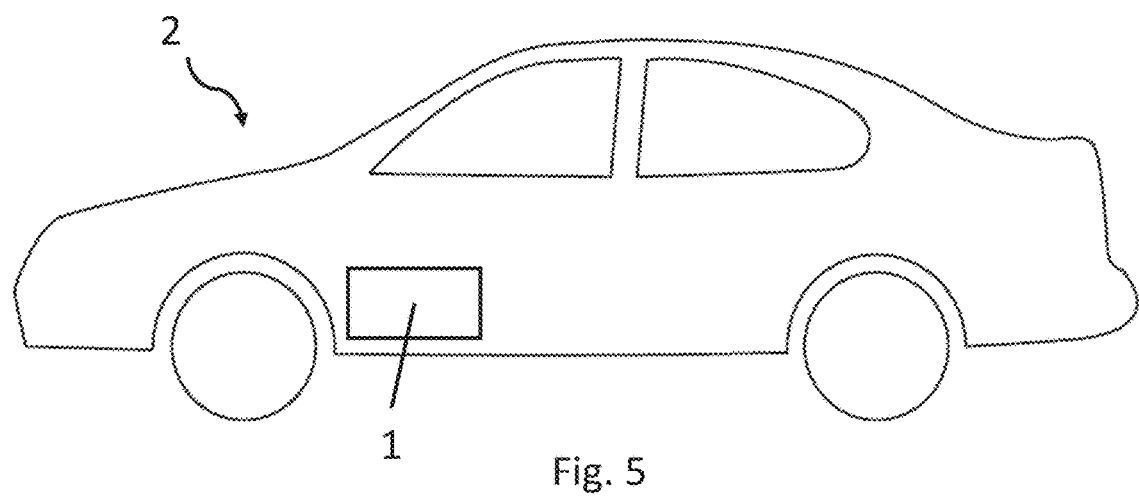
FIG. 5 shows a vehicle having a surround view system according to an embodiment of the invention.

FIG. 5 shows a vehicle 2 having a surround view system 1 which is described above and below. For the driver of the vehicle 2, an improved imaging of the detected data relating to the surroundings can be effected by the described surround view system, wherein the perspective of the illustration can be altered or respectively adapted according to the driver's wishes. By using an adapted projection surface, distortions due to raised objects can be reduced or respectively avoided.

Figure 6:
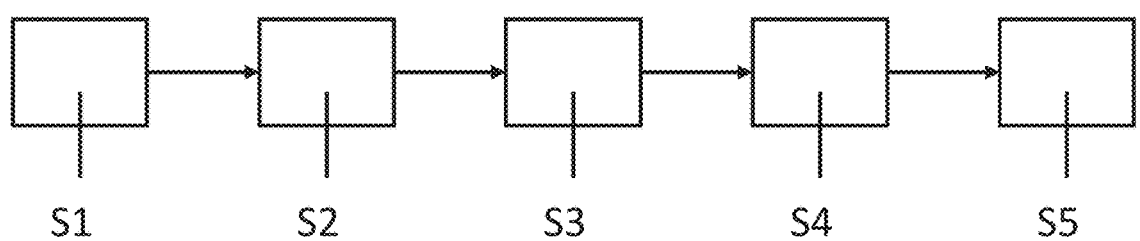
FIG. 6 shows a flow chart for a method for adapting a projection surface of a surround view system according to an embodiment of the invention.

FIG. 6 shows a flow chart for a method for adapting a projection surface for a surround view system. In step S1, data relating to the surroundings are detected by a detection unit. An object can be identified in this data relating to the surroundings in step S2. In step S3, the 3D shape of the object identified in step S2 is determined. The 3D shape of the object can, in this case, be identified directly by the detection unit or can be calculated by the evaluation unit, or the evaluation unit can have recourse to predefined 3D shapes and select the appropriate one on the basis of the detected data relating to the surroundings. In step S4, the determined 3D shape of the object is added to the projection surface of the surround view system. In step S5, the data relating to the surroundings of the detection unit are projected onto the adapted projection surface.

The invention claimed is:

1. A surround view system for a vehicle, comprising:
   a) a sensor arrangement comprising at least one sensor selected from cameras and depth information sensors, wherein the sensor arrangement is configured to detect surroundings of the vehicle including an object in the surroundings, and to produce surroundings data regarding the surroundings;
   b) a projection surface configured to have the surroundings data projected thereon; and
   c) a data processor configured:
      i) to identify the object in the surroundings data and to determine a 3D shape of the object,
      ii) to modify a configuration of the projection surface by adding the 3D shape of the object to the projection surface so as to thereby produce a modified projection surface,
      iii) to project the surroundings data onto the modified projection surface,
      iv) to identify, in the surroundings data, a concealed region that is concealed from the sensor arrangement by the object, and
      v) to treat the concealed region according to at least one of the following features:
         a first feature wherein, during the projecting of the surroundings data onto the modified projection surface, the concealed region is filled with a reflection of a portion of the surroundings data representing a detected side of the object,
         a second feature wherein the concealed region is removed from the projection surface.

2. The surround view system according to claim 1, wherein the data processor is configured to treat the concealed region according to the first feature.

3. The surround view system according to claim 1, wherein the data processor is configured to treat the concealed region according to the second feature.

4. The surround view system according to claim 1, wherein the sensor arrangement is a single sensor, which is one of said cameras.

5. The surround view system according to claim 1, wherein the data processor is configured to determine the 3D shape of the object by selecting a predefined 3D shape that corresponds to the object in the surroundings data.

6. The surround view system according to claim 1, wherein the data processor is configured to determine the 3D shape of the object from the surroundings data.

7. A vehicle comprising a vehicle body and the surround view system according to claim 1.

8. A method of operating a surround view system, comprising the following steps:
   a) with a sensor arrangement of the surround view system, detecting surroundings including an object in the surroundings, and producing surroundings data regarding the surroundings;
   b) with a data processor of the surround view system:
      b1) identifying the object in the surroundings data,
      b2) determining a 3D shape of the object,
      b3) modifying a configuration of a projection surface of the surround view system by adding the 3D shape of the object to the projection surface so as to thereby produce a modified projection surface,
      b4) projecting the surroundings data onto the modified projection surface,
      b5) identifying, in the surroundings data, a concealed region that is concealed from the sensor arrangement by the object, and
      b6) treating the concealed region according to at least one of the following features:
         a first feature wherein, during the projecting of the surroundings data onto the modified projection surface, the concealed region is filled with a reflection of a portion of the surroundings data representing a detected side of the object,
         a second feature wherein the concealed region is removed from the projection surface.

9. The method according to claim 8, wherein the treating of the concealed region is performed according to the first feature.

10. The method according to claim 8, wherein the treating of the concealed region is performed according to the second feature.

11. A non-transitory computer-readable medium, on which is stored a program that, when executed by a data processor, is configured to carry out the method according to claim 8.

* * * * *